(12) United States Patent
Hieb

(10) Patent No.: US 12,019,567 B2
(45) Date of Patent: *Jun. 25, 2024

(54) MEMORY SUB-SYSTEM MANUFACTURING MODE

(71) Applicant: Micron Technology, Inc., Boise, ID (US)

(72) Inventor: Adam J. Hieb, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/524,814

(22) Filed: Nov. 12, 2021

(65) Prior Publication Data

US 2022/0075741 A1 Mar. 10, 2022

Related U.S. Application Data

(63) Continuation of application No. 16/838,504, filed on Apr. 2, 2020, now Pat. No. 11,182,312.

(51) Int. Cl.
*G06F 13/38* (2006.01)
*G06F 1/10* (2006.01)
*G06F 9/4401* (2018.01)
*G06F 13/16* (2006.01)
*G06F 13/42* (2006.01)

(52) U.S. Cl.
CPC ............ *G06F 13/1668* (2013.01); *G06F 1/10* (2013.01); *G06F 13/4291* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 5,499,188 A * | 3/1996 | Kline, Jr. | ............... | G05B 15/02 700/106 |
| 5,768,612 A * | 6/1998 | Nelson | ................ | G06F 13/4027 712/32 |
| 6,237,048 B1 * | 5/2001 | Allen | .................... | G06F 13/423 710/72 |
| 6,690,947 B1 * | 2/2004 | Tom | ...................... | H04W 88/06 455/418 |
| 10,152,370 B2 | 12/2018 | Nale | | |
| 10,409,760 B1 | 9/2019 | Olarig | | |

(Continued)

FOREIGN PATENT DOCUMENTS

KR 10-2015-0120359 A 10/2015

OTHER PUBLICATIONS

Wu et al., "OneM2M-based IoT Protocol Integration", 2017, IEEE (Year: 2017).*

(Continued)

*Primary Examiner* — Hyun Nam
(74) *Attorney, Agent, or Firm* — Brooks, Cameron & Huebsch, PLLC

(57) ABSTRACT

A method includes enabling a manufacturing mode at least partially based on a first signal provided via one of a number of reserved pins of an interface connector. The method can further include providing, in response to enabling the manufacturing mode, a second signal to a memory component coupled to the interface connector via a number of other pins of the interface connector.

16 Claims, 4 Drawing Sheets

(56) References Cited

U.S. PATENT DOCUMENTS

| | | | |
|---|---|---|---|
| 11,182,312 B2* | 11/2021 | Hieb | G06F 1/189 |
| 2004/0182675 A1 | 9/2004 | Long | |
| 2005/0094463 A1* | 5/2005 | Nishizawa | G06K 19/077 |
| | | | 365/222 |
| 2009/0070505 A1* | 3/2009 | Krueger | H04L 12/66 |
| | | | 710/107 |
| 2010/0261048 A1* | 10/2010 | Kim | B60L 3/0046 |
| | | | 429/150 |
| 2013/0107408 A1 | 5/2013 | Le Brun | |
| 2013/0250644 A1 | 9/2013 | Watanabe | |
| 2014/0082224 A1 | 3/2014 | Kim | |
| 2014/0321217 A1 | 10/2014 | Song | |
| 2016/0147452 A1 | 5/2016 | Bae | |
| 2016/0306006 A1 | 10/2016 | Chanda | |
| 2017/0062077 A1 | 3/2017 | Kada | |
| 2017/0337066 A1 | 11/2017 | Han | |
| 2017/0344502 A1* | 11/2017 | Fernald | G06F 13/4282 |
| 2018/0062293 A1* | 3/2018 | Abraham | H01R 12/737 |
| 2018/0275905 A1 | 9/2018 | Olarig | |
| 2019/0272245 A1 | 9/2019 | Olarig | |
| 2019/0318798 A1 | 10/2019 | Frolikov | |
| 2020/0004446 A1 | 1/2020 | Palmer | |
| 2020/0301861 A1* | 9/2020 | Yu | G06F 13/423 |
| 2021/0157763 A1* | 5/2021 | Jabori | G06F 13/385 |
| 2023/0053798 A1* | 2/2023 | Rennig | H04L 12/40006 |

OTHER PUBLICATIONS

SNIA SFF TWG Technology Affiliate, "SFF-TA-1009 Specification for Enterprise and Datacenter SSD Pin and Signal Specification", Rev 2.0, May 22, 2018, 24 pages.

SNIA ADVANCINT Storage and Information Rechnology, "SFF-TA-1001 Specification for Uniersal x4 Link Definition for SFF-8639", Rev 1.1, May 28, 2018, 20 pages.

SSD Form Factor Work Group, "Enterprise SSD Form Factor", Version 1.0a, Dec. 12, 2012, 55 pages.

Jon Trantham, "Data is Potential NVMe/PCIe—HDD Ramifications, ocp discussion of OPtions for PCIe/NVMe HDD Devices", Jan. 23, 2019, 29 pages.

International Search Report and Written Opinion from related international application No. PCT/US2021/023121, dated Jul. 9, 2021, 10 pages.

Hakim Weatherspoon, "Gates and Logic", Spring 2013, Cornell University, (Year 2013).

Terry Sturtevant, "Electronics DIP Switches", Apr. 1, 2013, Wilfrid Laurier University (Year: 2013).

* cited by examiner

450 —

| ENABLING A MANUFACTURING MODE AT LEAST PARTIALLY BASED ON A FIRST SIGNAL PROVIDED VIA ONE OF A NUMBER OF RESERVED PINS OF AN INTERFACE CONNECTOR | — 452 |

| PROVIDING, IN RESPONSE TO ENABLING THE MANUFACTURING MODE, A SECOND SIGNAL TO A MEMORY COMPONENT COUPLED TO THE INTERFACE CONNECTOR VIA A NUMBER OF OTHER PINS OF THE INTERFACE CONNECTOR | — 454 |

MEMORY SUB-SYSTEM MANUFACTURING MODE

PRIORITY INFORMATION

This application is a Continuation of U.S. application Ser. No. 16/838,504, filed on Apr. 2, 2020, the contents of which are incorporated herein by reference.

TECHNICAL FIELD

Embodiments of the disclosure relate generally to memory sub-systems, and more specifically, relate to memory sub-system manufacturing mode.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
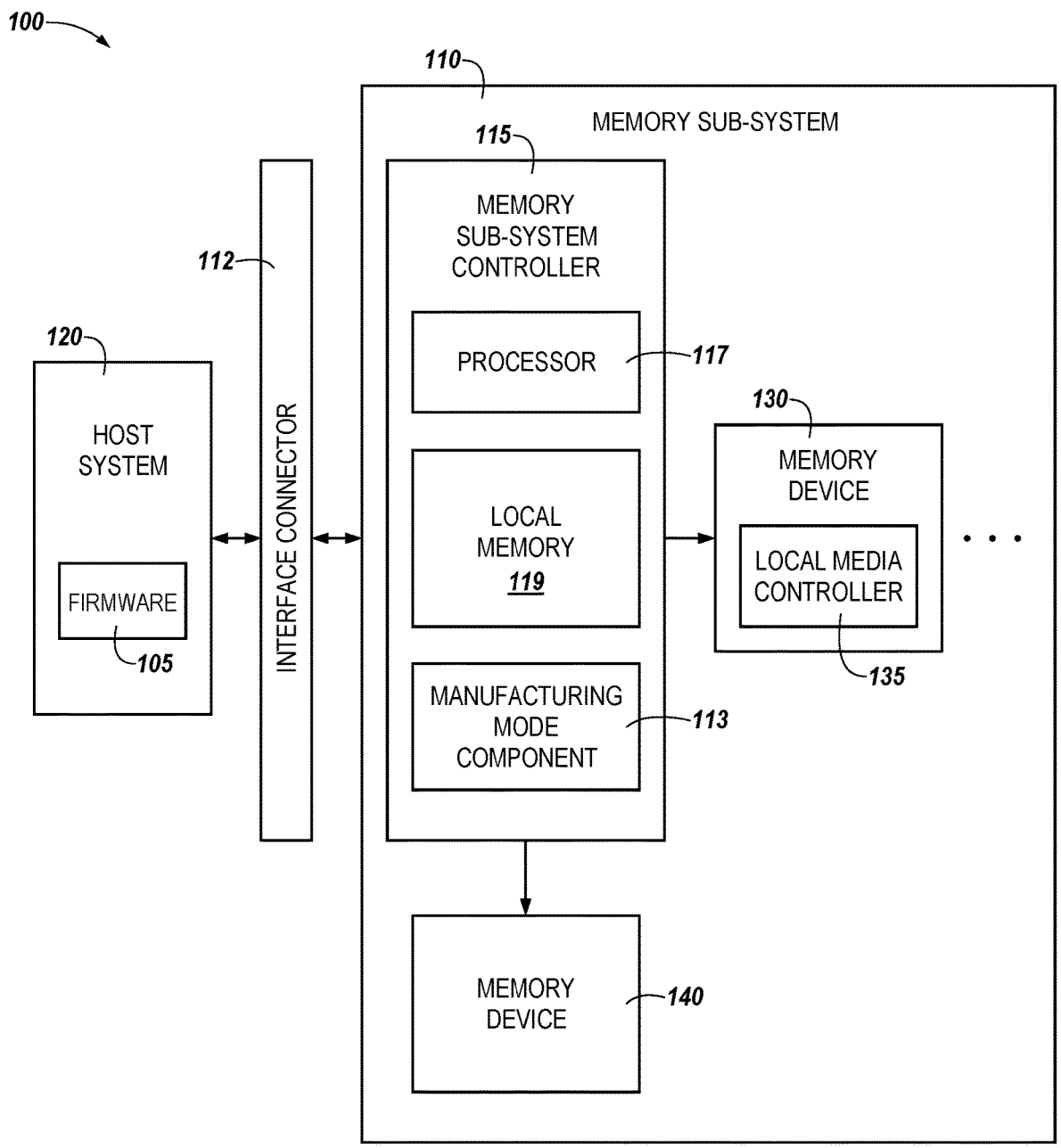
FIG. 1 illustrates an example computing system that includes an interface connector coupled to a host system and a memory sub-system in accordance with some embodiments of the present disclosure.

Aspects of the present disclosure are directed to circuitry for operating a memory sub-system in a manufacturing mode. A memory sub-system can be a storage device, a memory module, or a hybrid of a storage device and memory module. Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Prior to the memory sub-system being available to customers, a manufacturer (e.g., vendor) may desire to operate memory sub-systems to test and/or diagnose the memory sub-systems, and/or provide necessary software (e.g., firmware) to the memory sub-systems. To do so, the manufacturer may couple the memory sub-systems to a manufacturer-prepared host system, which can direct the memory sub-systems to be put into a manufacturing mode, during which the memory sub-systems can be tested, diagnosed, and/or provided with the necessary firmware (e.g., firmware images). More specifically, the manufacturer-prepared host system can direct an interface connector to provide particular signals to a memory sub-system controller of the memory sub-system, which can result in the memory sub-system being put into the manufacturing mode. The interface connector serves to couple the manufacturer-prepared host system to the memory sub-system.

Providing the signals from the interface connector to the memory sub-system controller can involve utilizing a number of pins (e.g., of the interface connector), and often, complexity of controlling an enablement of the manufacturing mode of the memory sub-systems can depend on what types and/or how many pins of the interface connector are being utilized. For example, using more pins and/or different types of pins simultaneously can add complexity to circuitry for enabling the manufacturing mode, which can make an initialization or pre-initialization stage of manufacture of the memory sub-system time consuming and/or costly.

Aspects of the present disclosure address the above and other deficiencies by providing a more efficient and/or more flexible approach to controlling enablement of the manufacturing mode, as compared to prior approaches. For example, embodiments can include controlling manufacturing mode via fewer pins (e.g., a single pin, in some implementations) than conventional approaches. In some embodiments, multiple pins of a same type, such as reserved pins that may not be in use in prior approaches, can be used to implement manufacturing mode. As such, embodiments described herein can provide for less complex circuitry implementation, which can reduce cost associated with manufacturing the memory sub-system and/or can result in a less time consuming manufacturing stage. Further, because some embodiments described herein utilize pins (e.g., reserved pins) not previously utilized for a manufacturing mode, those pins that had previously been utilized for enabling the manufacturing mode can be available and utilized for different operations and/or functions.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

In some embodiments, the host system 120 can be a manufacturer's host system that is configured to (e.g., direct the memory sub-system 110 to) test, diagnose, and/or provide firmware (e.g., firmware 105) to the memory sub-system 110. The firmware 105 that is to be provided to the memory sub-system 110 can be manufacturing test firmware (e.g., that can allow the memory sub-system 110 to be tested and/or diagnosed), operating system firmware, and/or firmware that is desired to be loaded to the memory sub-system 110 (e.g., memory sub-system controller 115) prior to the memory sub-system 110 being available to a customer (e.g., an entity purchasing a memory sub-system from the manufacturer).

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access the components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The computing system 100 can include the interface connector 112 that is coupled to the physical host interface. As used herein, the term "interface connector" refers to a physical connector implemented with a particular one of various communication protocols (e.g., one of the communication protocols described above in association with the physical host interface). The interface connector 112 can convert the commands received from the host system 120 into command instructions to access the memory device 130 and/or the memory device 140 as well as convert responses associated with the memory device 130 and/or the memory device 140 into information for the host system 120. In some embodiments, the interface connector 112 can be part of and/or embedded within the memory sub-system 110.

In a number of embodiments, the interface connector 112 can include a number of and/or different types of pins that can be utilized for passing control, address, and/or data, among other signals between the memory sub-system 110 and the host system 120. For example, the interface connector 112 can convert, via a number of pins, commands received from the host system 120 into command instructions (e.g., in the form of various signals) to access the memory device 130 and/or the memory device 140 as well as convert, via the number of pins, responses associated with the memory device 130 and/or the memory device 140 into information (e.g., in the form of various signals) for the host system 120. Further details of how a number of and different types of pins are utilized in assisting communication between the memory sub-system 110 and the host system 120 are described in connection with FIG. 2 and FIG. 3.

The memory devices 130 and 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type memory (e.g., 2D NAND and 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor. In some embodiments, the memory sub-system controller 115 can be configured to serve the memory sub-system 110 (e.g., host system 120, and/or memory devices 130 and/or 140) via the NVMe interface.

The memory sub-system controller 115 can be a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) (e.g., boot-ROM) for storing micro-code and/or instructions that allows the memory sub-system controller 115 to request the firmware 105 from the host system 102. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system controller 113 includes a manufacturing mode component 113 that can be configured to orchestrate and/or perform operations associated with a manufacturing mode and/or enabling/disabling the manufacturing mode. Although not shown in FIG. 1 so as to not obfuscate the drawings, the manufacturing mode component 113 can include various circuitry to facilitate the operations described herein. For example, the manufacturing mode component 113 can include a special purpose circuitry in the form of an ASIC, FPGA, state machine, and/or other logic circuitry that can allow the manufacturing mode component 113 to orchestrate and/or perform the operations described herein.

As described in more detail in connection with FIG. 2, FIG. 3, and FIG. 4, the manufacturing mode component 113 can be configured to determine whether the memory sub-system 110 (e.g., memory sub-system controller 115) needs to be put into a manufacturing mode, which can be further determined based on whether the memory sub-system controller 115 currently includes the firmware (e.g., firmware 105). In response to a determination that the memory sub-system 110 does not include the firmware, the manufacturing mode component 113 can request the manufacturing mode to be enabled such that the memory sub-system controller 115 can be provided with the firmware during the manufacturing mode. The manufacturing mode component 113 can further request the manufacturing mode to be disabled when the operations associated with the manufacturing mode are completed (e.g., the firmware 105 is received and stored in the memory sub-system controller 115).

In some embodiments, the operations performed by the manufacturing mode component 113 can be performed during an initialization or pre-initialization stage of manufacture of the memory sub-system 110 and/or the memory sub-system controller 115. Accordingly, in some embodiments, the manufacturing mode component 113 can perform the operations described herein during fabrication and/or subsequent to fabrication of the memory sub-system 110 but prior to packaging of the memory sub-system 110. Embodiments are not so limited, however, and in some embodiments, the manufacturing mode component 113 can perform the operations described herein during an operational stage of the memory sub-system 110 to, for example, request the firmware 105 to be provided to the memory sub-system 110 and/or memory sub-system controller 115.

In some embodiments, the memory sub-system controller 115 includes at least a portion of the manufacturing mode component 113. For example, the memory sub-system controller 115 can include a processor 117 (processing device) configured to execute instructions stored in local memory 119 for performing the operations described herein. In some embodiments, the manufacturing mode component 113 is part of the host system 110, an application, or an operating system.

Figure 2:
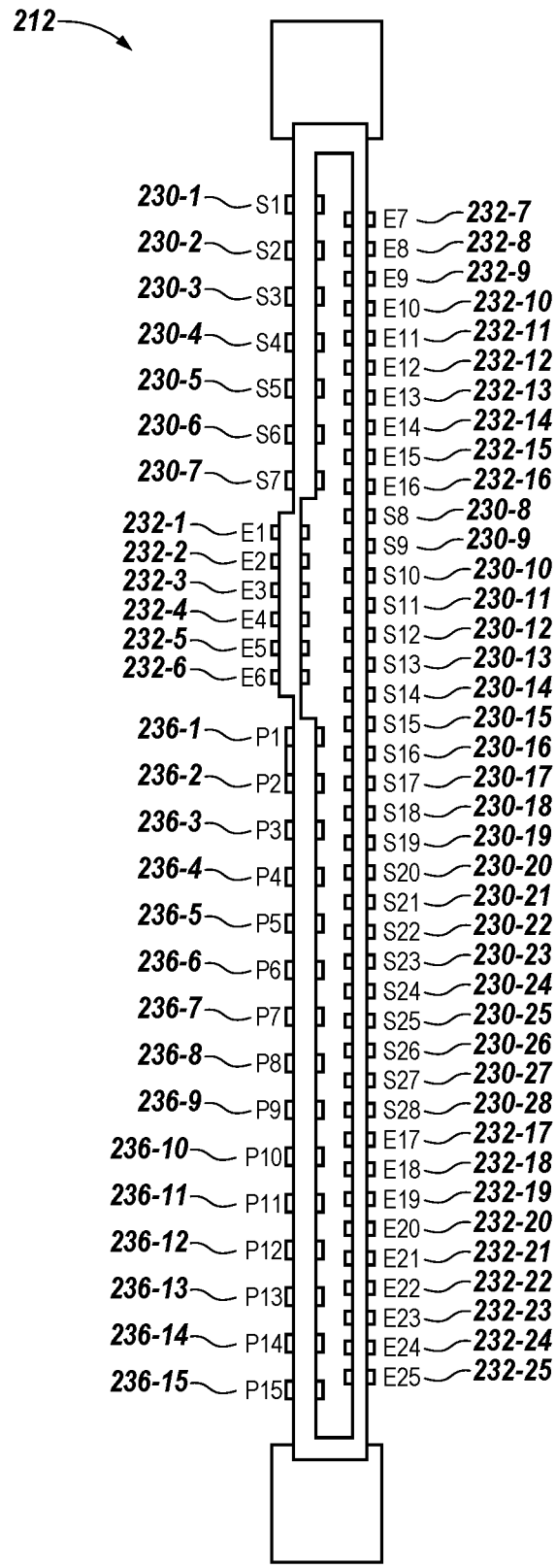
FIG. 2 illustrates an example of an interface connector in accordance with some embodiments of the present disclosure.

FIG. 2 illustrates an example of an interface connector 212 in accordance with some embodiments of the present disclosure. The interface connector 212 can be analogous to the interface connector 112 illustrated in FIG. 1. Although embodiments are not limited to utilizing a particular type of an interface connector, the interface connector 212 illustrated in FIG. 2 can be SFF-8639 (also referred to as U.2) and/or SFF-TA-1001 (also referred to as U.3) connectors.

The interface connector 212 can be configured to communicate with a host system and/or device via a number of pins as illustrated in FIG. 2. As used herein, the term "pin" refers to a physical interface that creates electrical terminations and is used to enable communication with other devices. As a non-limiting example illustrated in FIG. 2, the interface connector 212 includes S1, . . . , S7 (230-1, . . . , 230-7, respectively), E1, . . . , E6 (232-1, . . . , 232-6), P1, . . . , 15 (236-1, . . . , 236-15, respectively), E7, . . . , E16 (232-7, . . . , 232-16, respectively), S8, . . . , S28 (230-8, . . . , 230-28, respectively), and E17, . . . , E25 (232-17, . . . , 232-25, respectively) pins. In a number of embodiments, commands, addresses, and/or data can be communicated, via a number of pins of the interface connector 212, in the form of signals.

According to some approaches, for example, as defined by the Storage Networking Industry Association (SNIA) (formerly known as a Small Form Factor (SFF) committee), an interface connector such as interface connector 212 can be configured to provide signals via S15 pin (e.g., pin 230-15 and also referred to as host port type (HPT) 0 pin), E16 (pin 232-16 and also referred to as HPT 1 pin), and E25 (pin 232-25 and also referred to as dual port enable pin) to enable a manufacturing mode of a memory sub-system and/or memory components. These pins can be utilized in determining which type of slot a device (e.g., memory sub-system) is mated to, which type of host protocol the device is mated, and/or whether or not dual port mode is to be enabled. According to the SFF-TA-1001 specification, for example, the S15 pin can be utilized to differentiate whether the device coupled to the host system via an interface connector, such as the interface connector 212, is a SFF-8369 SSD or a SFF-TA-1001 SSD, the E16 pin can be utilized to differentiate whether a host protocol the device is coupled to via the interface connector, is a PCIe, Gen-Z, or undefined host protocol, and the E25 pin can be utilized to indicate whether a dual port mode is to be enabled or not. A corresponding operation mode based on a combination of values (e.g., with "HIGH" corresponding to logic "1" and "LOW" corresponding to logic "0") indicated by pins S15, E16, and E25 is listed in Table 1 as follows:

TABLE 1

| Operation Mode | | | |
| --- | --- | --- | --- |
| S15 | E16 | E25 | Device Operational Mode |
| HIGH | HIGH | HIGH | Host Port Quad PCIe Single *4 |
| HIGH | HIGH | LOW | Host Port Quad PCIe Dual *2 |
| LOW | HIGH | HIGH | Host Port SFF-TA-1001 Single *4 |
| LOW | HIGH | LOW | Host Port SFF-TA-1001 Dual *2 |
| HIGH | LOW | HIGH | Gen-z Single *4 |
| HIGH | LOW | LOW | Gen-Z Dual *2 |
| LOW | LOW | HIGH | Undefined Single *4 |
| LOW | LOW | LOW | Manufacturing Mode |

For example, as described in Table 1, S15 and E16 pins can be asserted high and E25 pin can be asserted low, which indicates that a host system utilizes a PCIe host protocol, and a memory sub-system coupled to the host system via the interface connector is a SFF-8639 SDD without a single port mode being enabled.

As further listed in Table 1, the manufacturing mode can be enabled by utilizing all three S15, E16, and E25 pins. For example, the interface pins S15, E16, and E25 can be asserted low (e.g., floated), which, according to the SINA, indicates an enablement of the manufacturing mode.

As described herein, utilizing multiple pins (e.g., S15, E16, and E25) with different types for enabling the manufacturing mode can add complexity to circuitry of the memory sub-system (e.g., memory sub-system 110). In contrast, embodiments described herein can utilize a single pin and/or multiple pins of a same type (e.g., reserved pins such as reserved "P" pins) for enabling the manufacturing mode, which can reduce cost associated with manufacturing the memory sub-system and/or the manufacture stage of the memory sub-system less time consuming. As used herein, a "reserved pin" refers to a pin that does not have a dedicated purpose assigned thereto in accordance with a particular specification or interface connector type. Particularly, embodiments described herein utilizes at least one of P7, P8, and/or P9 pins that have been utilized for providing a power supply voltage of 5V, with which the SFF-8369 and SFF-TA-1001 interface connectors are not compatible (e.g., as they are compatible with 3.3V and/or 12V). Accordingly, by utilizing the P pins that have not been used for the SFF-8369 and SFF-TA-1001 interface connectors, embodiments described herein can allow utilizing S15, E16, and E25 for other operations and/or functionalities at least during the manufacturing mode.

Figures 3, 4:
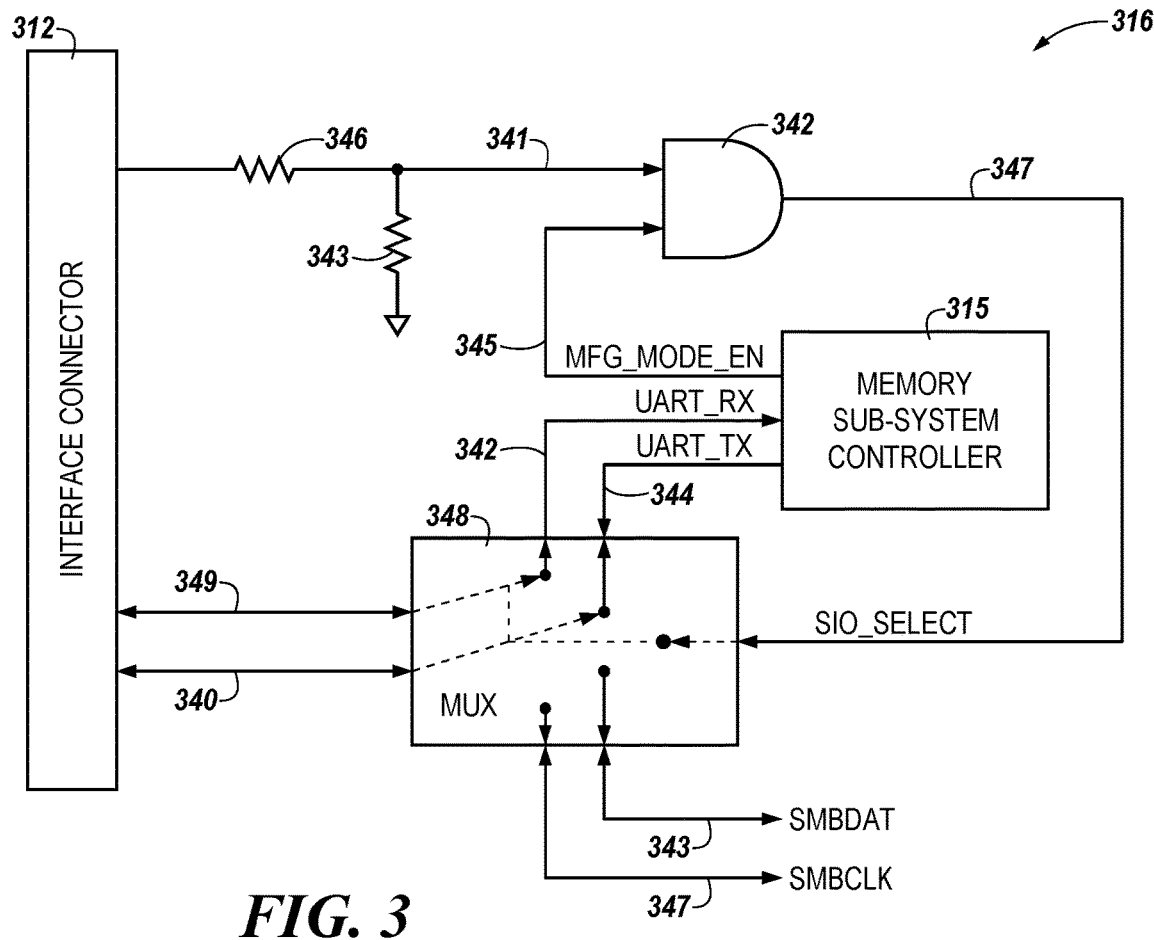
FIG. 3 illustrates an example of circuitry including an interface connector for enabling/disabling a manufacturing mode in accordance with some embodiments of the present disclosure.
FIG. 4 illustrates a flow diagram of an example method to operate a memory component in a manufacturing mode in accordance with some embodiments of the present disclosure.

FIG. 3 illustrates an example of circuitry 316 including an interface connector 312 for enabling/disabling a manufacturing mode in accordance with some embodiments of the present disclosure. The circuitry 316 can be a part of the memory sub-system (e.g., memory sub-system illustrated in FIG. 1). The interface connector 312 can be analogous to the interface connector 112 and 212 illustrated in FIG. 2 and FIG. 3, respectively, and can be SFF-8639 (also referred to as U.2) and/or SFF-TA-1001 (also referred to as U.3) connectors, although embodiments are not so limited. The example circuitry 316 can also include a memory sub-system controller 315 that can be analogous to the memory sub-system controller 115.

In the embodiment illustrated in FIG. 3, a logic gate 342 is coupled to the memory sub-system controller 315 and to the interface connector 312. In a number of embodiments, the logic gate 342 can be configured to receive signals from the interface connector 312 and the memory sub-system controller 315. Signals being communicated among the interface connector 312, the logic gate 342, and the memory sub-system controller 315 can be binary in nature. For example, the signal 341 received at the logic gate 342 from the interface connector 312 can correspond to a logic 1 (e.g., high) or a logic 0 (e.g., low) with one binary value indicating that the manufacturing mode is allowed (e.g., by host system 120 illustrated in FIG. 1) to be enabled and the other binary value indicating the contrary. For example, the signal 345 (MFG MODE EN), which is referred to as a manufacturing mode enable signal received at the logic gate 342 from the memory sub-system controller 315 can be toggled high or low to indicate whether the manufacturing mode has been requested by the memory sub-system controller 315.

Although embodiments are not so limited, in this example, the logic gate 342 is an AND gate.

The signal 341 can be provided to the logic gate 342 via at least one of a number of P pins (e.g., pins 236-1 to 236-15 illustrated in FIG. 2) of the interface connector 312. The number of P pins coupling the interface connector 312 to the logic gate 342 can include pins P7 (236-7 illustrated in FIG. 2), P8 (236-8 illustrated in FIG. 2), and/or P9 (236-9 illustrated in FIG. 2). In response to receipt of a command (e.g., allowing the manufacturing mode to be enabled), for example, one of the P7, P8, and P9 pins can be asserted high to provide a high signal to the logic gate 342. However embodiments are not so limited and more than one of the P7, P8, and/or P9 pins can be utilized for providing signals to the logic gate 342. For example, two or all three of the P7, P8, and P9 pins can provide respective signals to the logic gate 342 to enable the manufacturing mode.

In some embodiments, the P7, P8, and/or P9 pins can be utilized for providing a power supply voltage such as 5V, for example. For those memory sub-systems compatible with a different (e.g., lower) power supply voltage, such as 3.3 V, an additional resistance/resistor 346 can be added to the signal line carrying signal 341 such that the signal 341 being supplied to the logic gate 342 and/or memory sub-system controller 315 does not exceed a corresponding voltage tolerance limit.

A logical value of the signal being provided can be adjusted via open/drain circuitry including a pull-up resistor 343 that can be utilized to ensure a state of the signal to be known. For example, in response to the open-drain circuitry being in an open state, the pull-up resistor 343 can ensure that the signal 341 being provided from the P pin is high (e.g., logical "1") and in response to the open-drain circuitry being in a drain state, the pull-up resistor 343 can ensure that the signal 341 being provided from the P pin is low (e.g., logical "0").

In response to both signals from the memory sub-system controller 315 and the interface connector 312 indicating the enablement of the manufacturing mode (e.g., being high), the logic gate 342 can provide a signal 347 (SIO_SELECT), which is referred to as a switch signal, to a multiplexer 348. The state of signal 347 (e.g., high/low) can indicate the manufacturing mode is or is not enabled.

In response to receipt of the switch signal 347 (e.g., a high signal) from the logic gate 342, the multiplexer 348 can be configured to couple the interface connector 312 to the memory sub-system controller 315. For example, the multiplexer 348 can couple signal lines 349 and 340 (that are coupled to the interface connector 312 via a number of E pins) to signal lines 342 and 344 (that are coupled to the memory sub-system controller 315 via a Universal Asynchronous Receiver/Transmitter (UART)) of the memory sub-system controller 315. The signals being provided to the memory sub-system controller 315 via the signal lines 349 and 340 can be provided from the interface connector 312 via a number of E pins, such as E23 and E24 pins (e.g., pins 232-23 and 232-24 pins illustrated in FIG. 2). When the signal lines 342 and 344 are coupled to the signal lines 349 and 340 respectively, a host system (e.g., host system 120 illustrated in FIG. 1) can provide firmware (e.g., firmware 105 illustrated in FIG. 1) to the memory sub-system controller 315 (e.g., via pins E23 and E24).

When manufacturing mode is disabled (e.g., signals 341 or 345 are low/deasserted such that signal 347 is low/deasserted), the multiplexer 348 can be configured to couple (e.g., maintain coupling of) the signal lines 349 and 340 (e.g., that are coupled to the interface connector 312 via the E23 and E24 pins) respectively to signal lines 343 and 347 that can be utilized as sideband channels, such as system management bus (SMB)-implemented sideband channels. For example, the signal line 349 coupled to the signal line 343 as the SMB sideband channel can be utilized for transferring data (SMBDAT as illustrated in FIG. 3), and the signal line 340 coupled to the signal line 347 as the SMB sideband channel can be utilized for transferring clock signals (SMBCLK as illustrated in FIG. 3).

FIG. 4 illustrates a flow diagram 450 of an example method to operate a memory component in a manufacturing mode in accordance with some embodiments of the present disclosure. At block 452, the manufacturing mode can be enabled at least partially based on a first signal provided via one of a number of reserved pins of an interface connector (e.g., interface connector 112, 212, and/or 312 illustrated in FIG. 1, FIG. 2, and FIG. 3, respectively). As described herein, the number of reserved pins can include a number of P pins (e.g., P pins 236 illustrated in FIG. 2), such as P7, P8, and/or P9 pins (e.g., pins 236-7, 236-8, and/or 236-9 pins illustrated in FIG. 2). In contrast to some approaches in which the manufacturing mode was enabled by utilizing host port configuration type pins, such as E16, S15, and/or E25 pins, at block 452, the interface connector can be configured to transmit the signal, which enables the manufacturing mode, without utilizing the host port configuration type pins.

At block 454, the second signal can be provided to the memory component coupled to the interface connector in response to enabling the manufacturing mode (e.g., based on the first signal). The memory component can be analogous to one of components of the memory sub-system (e.g., memory sub-system 110 illustrated in FIG. 1), such as memory sub-system controller (e.g., memory sub-system controller 115 and/or 315 illustrated in FIG. 1 and FIG. 2, respectively). The second number of pins can include, for example, a number of E pins (e.g., E pins 232 illustrated in FIG. 2) of the interface connector.

In some embodiments, the second signal can include data to be transferred to the memory component and/or the memory sub-system and the data can include firmware being provided from a host system (e.g., host system 110 illustrated in FIG. 1), such as manufacturing test firmware, operating system firmware, or any combination thereof.

Figure 5:
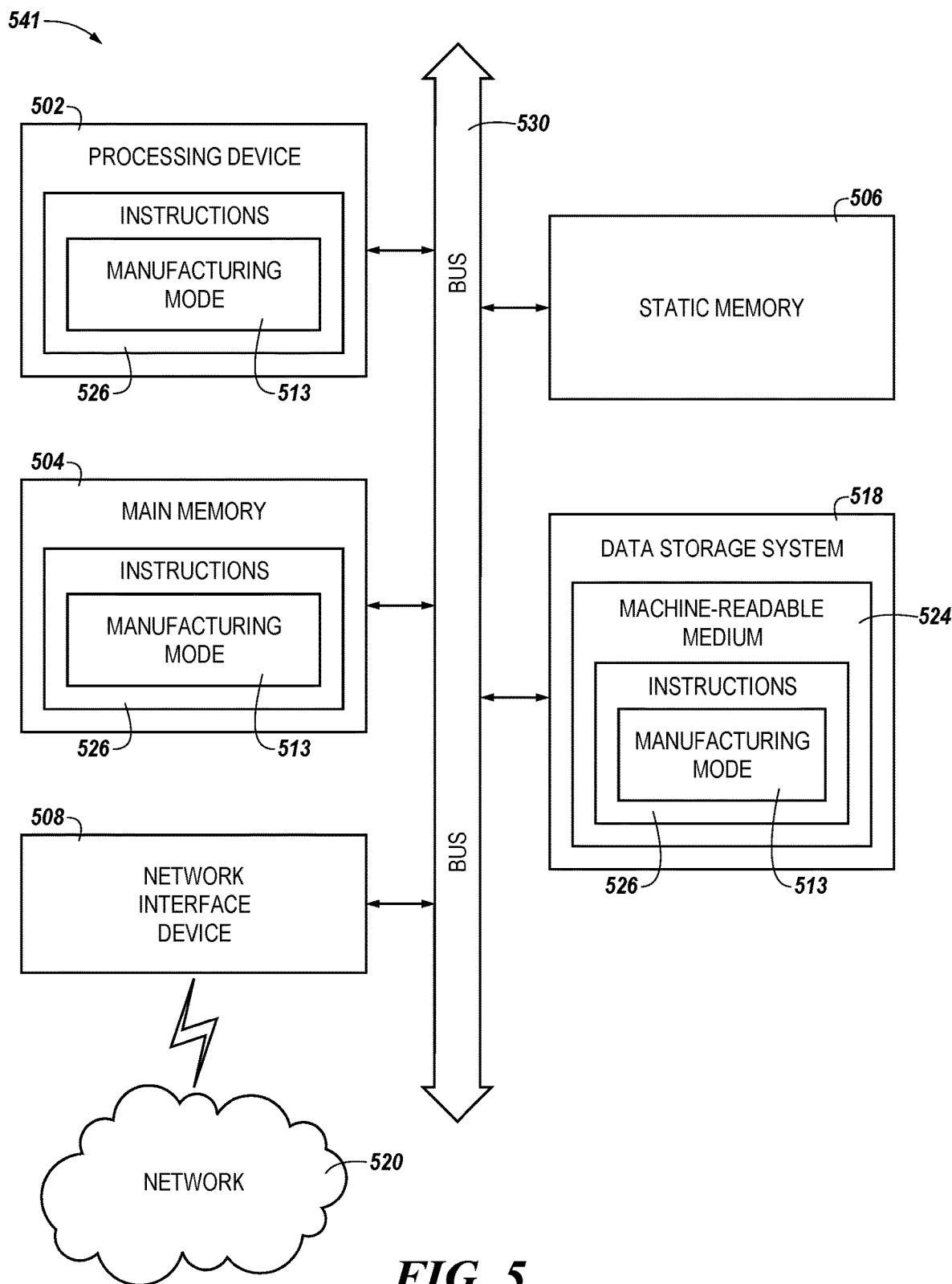
FIG. 5 is a block diagram of an example computer system in which embodiments of the present disclosure may operate.

FIG. 5 illustrates an example machine of a computer system 541 within which a set of instructions, for causing the machine to perform one or more of the methodologies discussed herein, can be executed. In some embodiments, the computer system 541 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the manufacturing mode component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 541 includes a processing device 502, a main memory 604 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 541 can further include a network interface device 508 to communicate over the network 520.

The data storage system 518 can include a machine-readable storage medium 524 (also known as a computer-readable medium) on which is stored one or more sets of instructions 526 or software embodying one or more of the methodologies or functions described herein. The instructions 526 can also reside, completely or at least partially, within the main memory 504 and/or within the processing device 502 during execution thereof by the computer system 541, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a compute component (e.g., the compute component 113 of FIG. 1). The instructions can include a manufacturing mode instruction 513 associated with performing operations with a manufacturing mode component (such as manufacturing mode component 113 in FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
an interface connector comprising:
one or more first pins that are reserved pins for a first communication protocol, the one or more first pins configured to switch, to a manufacturing mode, an operation mode of the apparatus that operates according to a second communication protocol; and
one or more second pins configured to:
transfer, during the manufacturing mode, system management bus data (SMBDAT) or a system management bus clock signal (SMBCLK); and
transmit, in an operation mode different than the manufacturing mode, a universal asynchronous receiver/transmitter (UART) transmit signal and a UART receive signal.

2. The apparatus of claim 1, wherein the one or more first pins corresponds to one or more P pins of an SFF-8639 or SFF-TA-1001 interface connector.

3. The apparatus of claim 1, wherein the one or more first pins do not include a dual port enable pin.

4. The apparatus of claim 1, wherein the one or more first pins do not include one or more E pins of an SFF-8639 or SFF-TA-1001 interface connector.

5. The apparatus of claim 1, wherein the one or more first pins do not include a host port configuration type pin.

6. The apparatus of claim 1, wherein the interface connector is a peripheral component interconnect express (PCIe) connector.

7. A system, comprising:
a memory component configured to operate according to a first communication protocol or a second communication protocol; and
an interface connector comprising a first pin configured to:
provide a power supply voltage that is compatible with a first communication protocol; and
switch, to a manufacturing mode, an operation mode of the memory component when the memory component operates according to a second communication protocol;
the interface connector further comprising a second pin configured to:
provide firmware to the memory component in the manufacturing mode, wherein the firmware corresponds to at least one of manufacturing test firmware, operating system firmware, or any combination thereof; and
transfer, in an operation mode different than the manufacturing mode, a universal asynchronous receiver/transmitter (UART) transmit signal and a UART receive signal to the memory component.

8. The system of claim 7, wherein the interface connector is an U.2 or U.3 interface connector.

9. The system of claim 8, wherein the first pin comprises a P7, P8, or P9, or any combination thereof, of the interface connector.

10. The system of claim 8, wherein the second pin is configured to transfer, in the manufacturing mode of the memory component, system management bus data (SMBDAT) or a system management bus clock signal (SMBCLK).

11. The system of claim 8, wherein the second pin includes E24 pin or E25 pin of an SFF-8639 or SFF-TA-1001 interface connector.

12. A system, comprising:
a memory component configured to operate with a first power supply voltage; and
an interface connector comprising:
one or more first pins, the interface connector configured to switch, via the one or more first pins that are configured to provide a second power supply voltage having a voltage level greater or less than that of the first power supply voltage, an operation mode of the memory component to a manufacturing mode; and
one or more second pins configured to transfer, during the manufacturing mode, system management bus data (SMBDAT) or a system management bus clock signal (SMBCLK).

13. The system of claim 12, wherein the one or more first pins are further coupled to a resistor to reduce a voltage level of the second power supply voltage provided by the one or more first pins to be compatible with the first power supply voltage.

14. The system of claim 12, wherein:
the memory component is further configured to operate according to a first communication protocol; and
the second power supply voltage is compatible with a different memory component that operates according to a second communication protocol.

15. The system of claim 12, wherein the one or more first pins comprises a single pin of the interface connector.

16. The system of claim 12, wherein the memory component is a controller configured to serve the system via a non-volatile memory express (NVMe) interface.

* * * * *